April 21, 1942.   R. BERNHARDT   2,280,211
MACHINE FOR CHOPPING NUT MEATS
Filed Aug. 1, 1940
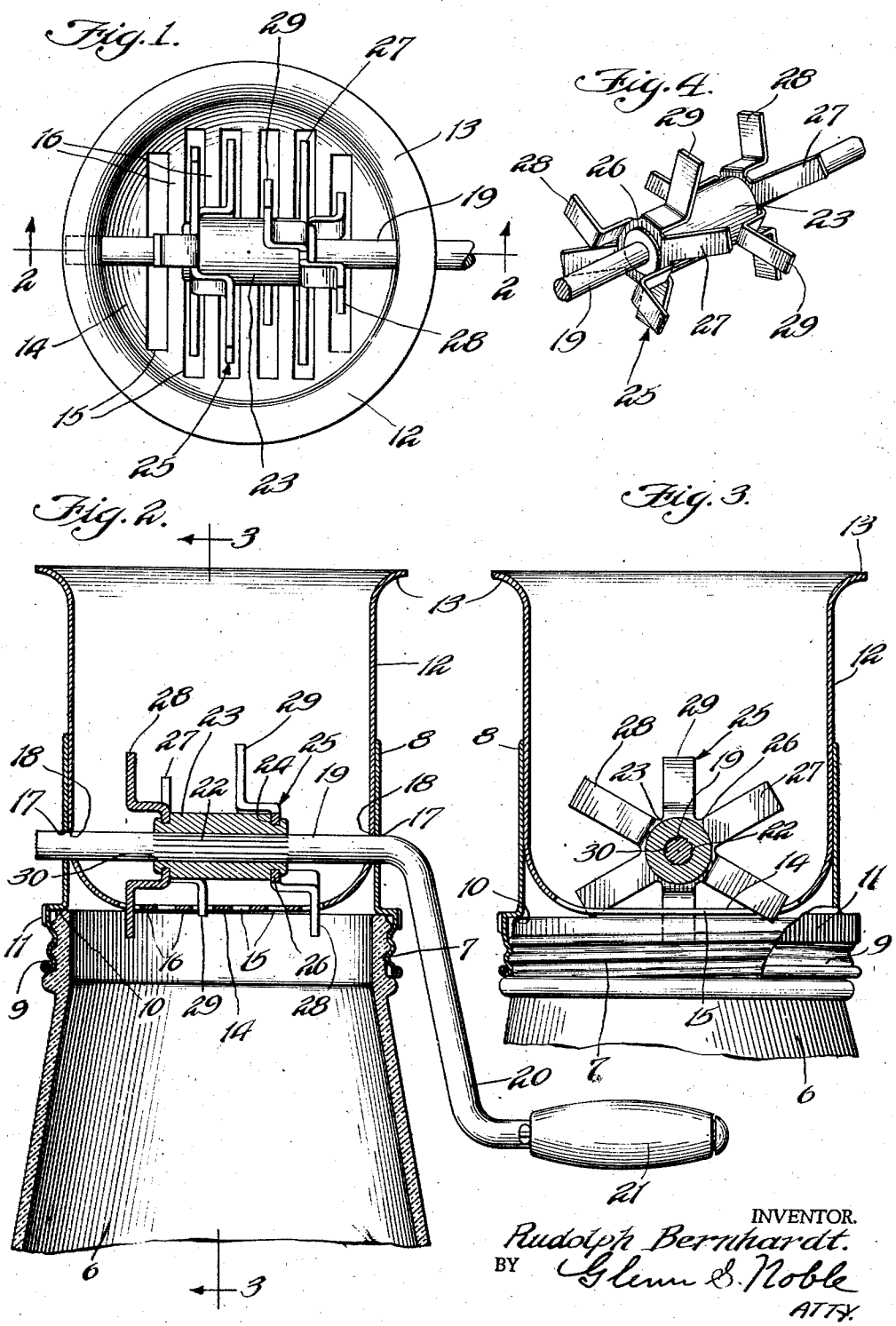
INVENTOR.
Rudolph Bernhardt.
BY Glenn S. Noble
ATTY.

Patented Apr. 21, 1942

2,280,211

UNITED STATES PATENT OFFICE 2,280,211

MACHINE FOR CHOPPING NUT MEATS

Rudolph Bernhardt, Chicago, Ill.

Application August 1, 1940, Serial No. 349,326

4 Claims. (Cl. 146—123)

This invention is a device for cutting, chopping or breaking nut meats or kernels and is intended more particularly for household or kitchen use. I am aware that devices of this kind have heretofore been proposed or used and the present invention is directed particularly to simplifying and improving the construction of such cutters or choppers whereby they may be made in an inexpensive manner.

The objects of the invention are to provide an improved device of the character set forth which will be sturdy and substantial in construction and efficient in operation; to provide a nut cutter or chopper composed of a minimum number of parts which may be readily assembled to make a complete or operative device; to provide a nut chopper which may be readily attached to a receptacle such as a jar or the like and to provide such advantages and novel features as will appear more fully hereinafter.

In the accompanying drawing illustrating this invention:

Fig. 1 is a plan view of a commercial form of the device shown on a somewhat enlarged scale;

Fig. 2 is a vertical sectional view taken on the line 2—2 of Fig. 1 and showing the device attached to a jar or container;

Fig. 3 is a sectional view taken substantially on the line 3—3 of Fig. 2; and

Fig. 4 is a perspective view of the rotatable cutter element.

The container 6 is intended to illustrate any suitable receptacle for receiving chopped nut meats as for instance a glass jar having a threaded neck 7. A base or cylinder 8, preferably formed of thin metal, has an enlarged lower end providing a threaded skirt 9 for engagement with the threaded neck of the container. The shoulder 10 at the point of enlargement, may engage with the upper end of the neck. The skirt 9 has a knurled band 11 for convenience in applying and removing the device from the container.

A substantially cylindrical hopper 12 fits closely in the base or cylinder 8 as shown in Fig. 2 and may be forced into position if desired. The upper end of the hopper preferably has an outwardly extending flange 13. The bottom 14 of the hopper is preferably formed integrally therewith and has a plurality of parallel slots 15 forming intermediate cutting or chopping bars 16 which extend transversely across the bottom as shown in Fig. 1.

The cylinder 8 and the hopper 12 are provided respectively with diametrically opposed holes 17 and 18 which provide a bearing for a shaft or rod 19 which serves to fasten or hold the cylinder and hopper in assembled position. One end of this shaft is bent to form a crank 20 which has a handle 21 for turning same.

A portion of the shaft 19 is ridged or knurled as shown at 22 for engagement with a sleeve 23. The ends of the sleeve are reduced or shouldered at 24 for receiving the chopping or breaking elements 25. Each of these elements consists of a disk or ring 26 which fit over the reduced ends of the sleeve and are held in position by riveting or the like. Each disk has three sets of oppositely disposed blades 27, 28 and 29 which are preferably formed integrally therewith. The blades 27 lie in the same plane as the rings 26 and are adapted to move downwardly through one of the slots 15 and coact with the adjacent bars. The blades 28 extend for a short distance substantially parallel to the shaft and then project outwardly in a plane parallel to the plane of the ring or so that they will engage with the next adjacent slots 15 toward the sides of the hopper as also shown in Fig. 1. The blades 29 also extend for a short distance substantially parallel to the shaft in a direction opposite from the blades 28 and then extend outwardly so that they will cooperate with the slots adjacent to the center of the hopper. The cutting elements may be stamped from sheet metal and quickly formed and assembled on the sleeve so that the complete cutter cylinder with cutting blades may be rapidly formed and assembled. When the chopper is to be completed, the final assembly is made by holding the cutting cylinder with the teeth thereon in position in the hopper by means of suitable jigs or holders and then inserting the shaft 19 through one set of holes and forcing it through the bore 30 of the sleeve 23 which provides a tight fit or engagement between these parts. When thus assembled, some of the cutter blades will always be projected through their cooperating slots and will engage with the adjacent bars to prevent more than a limited longitudinal movement of the shaft and parts connected therewith. In other words, this assembly operation completes the machine so that it is ready for use.

When the device is to be used, it is mounted on the container and the nut meats, kernels or material to be chopped or cut is placed in the hopper. The rotation of the crank causes the cutter arms to pass progressively through the slots and to coact with the bars to cut or chop the nuts or the like.

I have shown and described a preferred commercial form of my invention, but changes may be made in the details of the construction or the arrangement of the parts without departing from the scope of the invention as set forth in the following claims in which I claim:

1. A device of the character set forth comprising a cylindrical base having means at the lower end for securing it to a receptacle, a cylindrical hopper fitting tightly in the base and having an integrally formed slotted bottom providing a plurality of bars, a crank shaft extending through holes in the base and hopper adjacent to the lower end of the hopper and serving to hold the base and hopper together, a sleeve fixed on the shaft within the hopper, and blades extending radially from the sleeve and adapted to register with the slots whereby they will cooperate with the bars for chopping or cutting purposes.

2. In a machine for chopping nut meats or the like, the combination of a base or supporting portion having a threaded skirt for engagement with the threaded top of a container, a hopper positioned in the base and having parallel bars in the bottom thereof, a shaft extending laterally through the hopper and base, and having a crank for turning same, a hub secured to the shaft within the hopper, and a plurality of blades carried by the hub and adapted to pass through the spaces between the bars, said blades being positioned so that at least one blade will always extend through one of the spaces whereby it will hold the shaft and parts secured thereto against more than a limited longitudinal movement.

3. In combination, a receptacle having a threaded neck, a cylinder formed of thin metal with a threaded skirt engaging said neck, a cylindrical hopper also formed of sheet metal fitting closely within said cylinder and having slots in the bottom thereof, forming parallel cutter bars, a shaft extending through holes in the cylinder and hopper adjacent to the bottom of the hopper, means for turning said shaft, a sleeve secured to the shaft within the hopper, disks secured to the ends of the sleeve each disk having a plurality of integrally formed cutter blades, said blades extending outwardly in different planes whereby they will engage with different slots in the bottom of the hopper.

4. A cutting cylinder for a nut meat chopper comprising a sleeve having reduced ends, disks engaging said ends and held in position by riveting, each of said disks having pairs of radially extending oppositely disposed blades, one pair of said blades lying in the same plane as the disk and the other blades being bent and having their cutting portions positioned in different planes parallel to the planes of the disks substantially described.

RUDOLPH BERNHARDT.